United States Patent [19]

Oshikubo et al.

[11] 4,399,712
[45] Aug. 23, 1983

[54] SEMI-AUTOMATIC ELECTRO-MECHANICAL PIPETTE WITH CONTROLLED TIP REMOVER

[75] Inventors: Yuji Oshikubo, Sakura; Sadakazu Tanabe, Kawasaki, both of Japan

[73] Assignee: Nichiryo Co., Ltd., Tokyo, Japan

[21] Appl. No.: 249,094

[22] Filed: Mar. 30, 1981

[30] Foreign Application Priority Data

Feb. 9, 1981 [JP] Japan .................................. 56-17670

[51] Int. Cl.³ ............................................. G01N 1/14
[52] U.S. Cl. ................................. 73/864.16; 604/155; 422/100
[58] Field of Search ........... 73/864.16, 864.13, 864.01; 128/218 A, DIG. 1, 236, 214 F, 655; 422/100; 604/155, 154, 152, 67

[56] References Cited

U.S. PATENT DOCUMENTS

| | | | |
|---|---|---|---|
| 3,701,345 | 10/1972 | Heilman et al. .................. | 128/655 |
| 3,753,657 | 8/1973 | Doroning et al. ............... | 73/864.16 |
| 3,853,012 | 12/1974 | Scordato et al. ................ | 73/864.16 |
| 4,030,495 | 6/1977 | Virag ................................ | 128/214 F |

FOREIGN PATENT DOCUMENTS 2033780  5/1980  United Kingdom ................ 422/100

Primary Examiner—E. R. Kazenske
Assistant Examiner—Tom Noland
Attorney, Agent, or Firm—James E. Nilles

[57] ABSTRACT

A pipette device adapted to removably mount a tip at its lower end and having a housing in which there are provided a cylinder chamber communicating with the interior of the mounted tip, a plunger adapted to operate in the cylinder chamber for sucking a liquid and then discharging the same, a direct current motor coupled to the plunger through a plunger driving mechanism, and a potentiometer for producing a voltage signal representing the position of the plunger, so that sucking and discharging of the liquid can be effected by detecting the voltage signal produced by the potentiometer and controlling the direction and amount of the rotation of the motor by the utilization of such detected voltage signal. Also disclosed is a control device for use with the pipette device including a servo system for receiving the voltage signal produced by the potentiometer as a feedback signal and a sequence circuit adapted to change the balance-point of the servo system in a preselected sequence.

6 Claims, 6 Drawing Figures

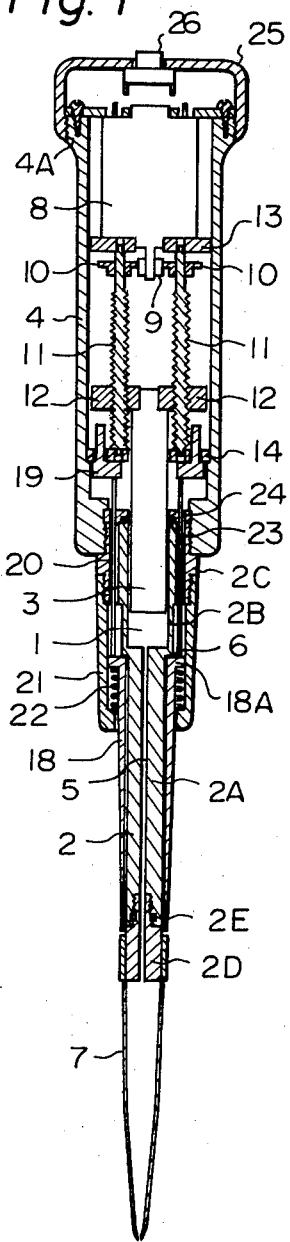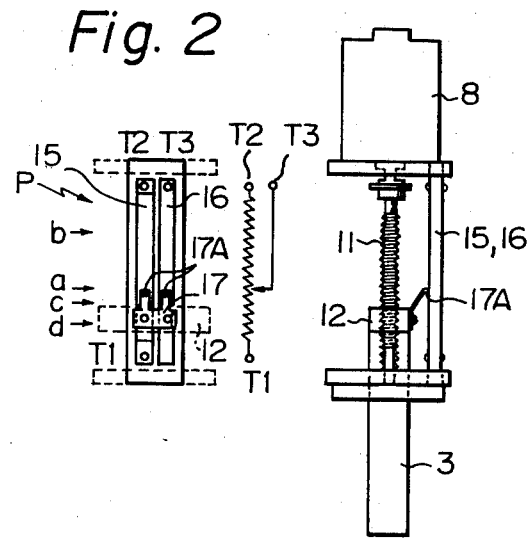

SEMI-AUTOMATIC ELECTRO-MECHANICAL PIPETTE WITH CONTROLLED TIP REMOVER

BACKGROUND OF THE INVENTION

This invention relates generally to a pipette device, and more particularly to a pipette device which makes it possible to perform the operations of sucking a liquid (that is, introduction of a liquid into a tip), discharging the same (that is, removal of the liquid from the tip) and removing a tip simply by operating a single electrical switch.

There have been known pipette devices which comprise a housing graspable with an operator's single hand within which there are provided a cylinder, a plunger or piston adapted to operate in the cylinder to suck a liquid and then discharge the same, an operating rod secured to the upper end of the plunger, and a return spring for exerting upward bias force onto the operating rod, whereby the respective operations of sucking a liquid, discharging the same and removing a tip are effected by manipulation of an operating knob secured to the upper end of the operating rod by an operator's finger. With such a known pipette device, when it is desired to suck a liquid, the operating knob is lowered by a certain distance against the force of the return spring and then released so as to allow the plunger to be returned upwardly by the force of the return spring. When it is desired to discharge the liquid thus sucked, the operating knob is lowered again. When it is desired to remove the tip, a separate knob provided for this purpose is depressed.

It is troublesome to manually operate such an operating knob.

Further, such a prior art device as mentioned above has the disadvantage that reproducibility or consistency of performance is not good because the operating knob is operated manually and slight changes in sucking speed are caused by variations in finger pressure durig the sucking operation thereby causing variations in the volume of the liquid sucked.

Further, in most cases, such devices of this kind are used by female operators and therefore there is risk of inducing a work-related disorder such as tenonitis or the like as a result of the operator's finger fatigue if a lot of objects are to be sampled.

SUMMARY OF THE INVENTION

With this background of the invention in mind, it is therefore a primary object of this invention to provide a pipette device which obviates the above-mentioned disadvantages in the prior art devices and in which the operations of sucking a liquid and discharging the same can be effected without requiring use of the operator's finger for the knob lowering operation.

Another object of this invention is to provide a pipette device in which the respective operations of sucking a liquid, discharging the same and removing a tip can be simply performed by operating a single electrical switch.

A further object of this invention is to provide a pipette system of the type that comprises (a) a pipette device in the form of a housing graspable by an operator's single hand and provided therein with a plunger driving system and (b) a control device coupled with the pipette device through an electric cable so as to cause the plunger driving system to drive a plunger in desired sequence of operations to perform the respective operations of sucking a liquid, discharging the same and removing a tip.

According to this invention, the pipette device comprises a lower housing member adapted to mount a tip at the lower end and formed therein with a cylinder chamber which communicates with the interior of the tip, a upper housing member secured to the upper end of the lower housing member and provided therein with a plunger which operates in the cylinder chamber to suck a liquid and discharge the liquid, a small DC motor mounted within the upper housing member near the upper end thereof and coupled with the upper end portion of the plunger through a plunger driving mechanism, and a potentiometer mounted within the upper housing member for producing a voltage which varies in accordance with the position of the plunger.

In a preferred embodiment, the pipette device is constructed so that it further comprises a tip removing mechanism having a lower portion in the form of a tube slidably fitted on the lower portion of the outer periphery of the lower housing member and an upper portion extending to a position in the upper housing member at which the plunger driving mechanism can engage with the upper portion, and a spring member for biasing the tip removing mechanism to keep it in its upper or non-operative position so long as the plunger is not lowered beyond a predetermined lower limit. Having such a construction as mentioned above, the pipette device enables the respective operations of sucking a liquid, discharging the same and removing a tip to be effected by controlling the direction and amount of the rotation of the motor while detecting the position of the plunger based on the variable voltage derived from the potentiometer.

The reasons why the pipette device can be arranged in the configuration graspable by an operator's one hand even if an electric motor is incorporated within the housing are that since a DC motor is used as the electric motor a relatively large operating force can be obtained (in comparison with the case where a stepping motor is utilized, for example), and that since a servo system utilizing as a feedback element a potentiometer adapted to produce a voltage variable in accordance with the plunger position is used, the mechanical accuracy of the mechanism used for converting the rotary motion of the motor into the linear motion of the plunger does not affect the amount of displacement of the plunger, i.e. the sucking of the same volume of liquid each time, thereby making it possible to simplify the construction of the converting mechanism.

Further, this invention may be embodied as a system of the type that has a control device in addition to a pipette device, in which case the pipette device comprises a cylindrical housing with a cylinder chamber formed therein which will communicate with the interior of a tip when the tip is mounted and provided therein with a plunger which operates in the cylinder chamber to suck a liquid and discharge the same, a small DC motor mounted within the housing and coupled with the plunger through a plunger driving mechanism, and a potentiometer mounted within the housing for producing a voltage which varies in accordance with the position of the plunger, while, on the other hand, the control device comprises a servo system receiving as a feedback voltage the variable voltage produced by the potentiometer and supplying the motor with driving power, and a sequence circuit adapted to sequentially change its output status in response to a stepping signal produced when a start switch is actuated or when the servo system reaches a balance-point to thereby change the balance-point of the servo system in a preselected sequence, the servo system being arranged so as to reach a balance-point during the initial status, the liquid sucking completion status and the liquid discharging completion status.

Preferably, the servo system may include means for setting an amount of liquid to be sucked by setting the balance-point of the servo system corresponding to the liquid sucking completion status to one of a plurality of predetermined points.

BRIEF DESCRIPTION OF THE DRAWINGS

For a more complete understanding of the invention, reference is now made to the following Figures wherein:

FIG. 1 shows a vertical sectional view of the pipette device portion of a pipette system constructed in accordance with the invention, FIG. 2 shows the disposition of a potentiometer used in the device of FIG. 1 together with its electrical circuit, FIG. 3 shows the manner of connection of the movable contact of the potentiometer shown in FIG. 2 to a plunger driving mechanism.

DESCRIPTION OF THE PREFERRED EMBODIMENTS

Figure 4:
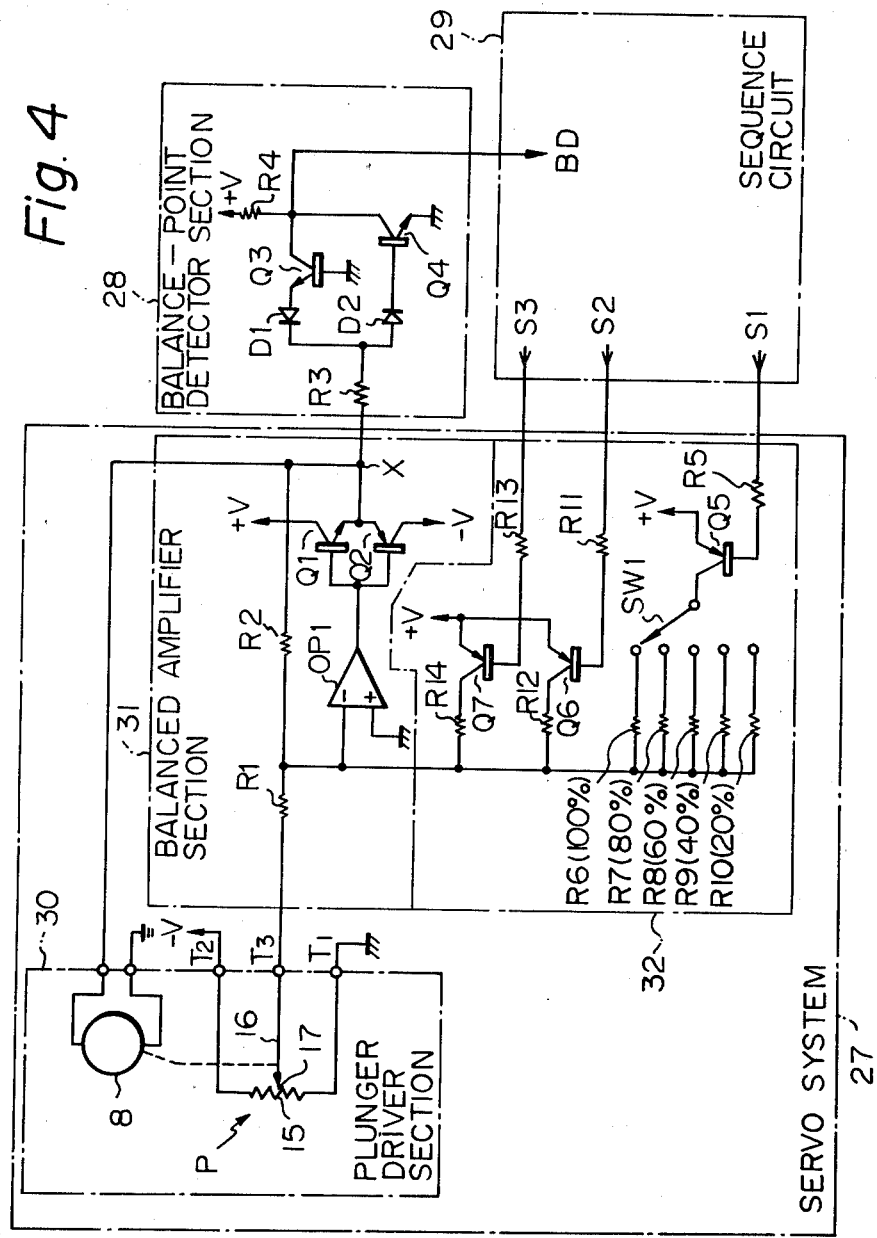
FIG. 4 shows one example of the circuit configuration of the control device portion of a pipette system according to the invention.

Now referring to FIG. 1, a housing constituting a pipette device is composed of a cylindrical lower housing member 2 having a cylinder chamber 1 formed therein and a cylindrical upper housing member 4 coaxially secured to the lower housing member 2 through a threaded engagement therebetween and provided therein with a plunger 3 which operates in the cylinder to perform the operations of sucking a liquid and discharging it. The outer diameter of the upper housing member 4 is enlarged at its top portion so as to form a flange portion 4A thereat. The lower housing member 2 is composed of a cylindrical lower portion 2A provided therein with a slender passageway 5, a cylindrical intermediate portion 2B having an outer diameter slightly larger than that of the lower portion 2A, and a cylindrical upper portion 2C having an outer diameter larger than that of the intermediate portion 2B. The intermediate portion 2B defines at its lower end a shoulder portion 6 and is provided therein with a space which constitutes a lower portion of the cylinder chamber 1 in communication with the passageway of the lower portion 2A. The upper portion 2C is provided with a space which forms the remainder of the cylinder chamber 1. The lower portion 2A of the lower housing member 2 may have a replaceable tips setting nozzle 2D removably attached to the end thereof through a threaded engagement therebetween. An annular groove 2E is formed in a part of an inner threaded portion of the lower portion 2A of the lower housing member 2 which is engageable with a part of an outer threaded portion of the nozzle 2D. An O-shaped ring (not numbered) is fitted in this groove 2E as shown in FIG. 1. A tip 7 may be attached to the outer periphery of the nozzle 2D so that the cylinder chamber 1 communicates with the interior of the tip 7 when it is mounted.

A small DC motor is mounted within the upper housing member 4 near the upper end thereof. A rotary shaft of this motor 8 is coupled with a pair of lead screws 11 through a gear 9 secured to the rotary shaft and a pair of gears 10 each of which meshes with the gear 9. A pair of nuts 12 are secured to the upper end of the plunger 3 and adapted to be moved respectively along the lead screws 11 in the axial direction. The opposite ends of each of the lead screws 11 are respectively journaled by a pair of plate members 13 and 14 provided at intermediate portions of the cylinder chamber 1. As the motor 8 rotates, the plunger is moved upward or downward depending on the direction of rotation of the motor 8, by a distance proportional to the amount of rotation of the motor 8. That is, the lead screws 11 and the nuts 12 adapted to be moved by the lead screws 11 constitute a plunger driving mechanism.

A linear displacement type potentiometer P comprised of, as shown in FIG. 2, a resistor element 15, a conductive bar 16 and a slider 17 constituting a movable contact is disposed on the lower or upper side of the plunger driving mechanism when viewed in the figure. The slider 17 is secured to one of the nuts 12 as shown in FIG. 3. FIG. 2 shows that the opposite ends of the resistor element 15 are connected to a pair of terminals $T_1$ and $T_2$ while the slider 17 is connected to a terminal $T_3$ through the conductive bar 16. The terminals $T_1$ and $T_2$ are connected to the terminals of a DC electric power source, as shown later in FIG. 4. Thus, a voltage which varies in accordance with the position of the plunger 3 is produced at the terminal $T_3$. In each of FIGS. 2 and 3, the nut 12 is shown at the same vertical height as in FIG. 1 and in each of FIGS. 1 to 3 the state of the plunger 3 is immediately before the initiation of the sucking operation.

The device shown in FIG. 1 is also provided with a tip removing mechanism. The tip removing mechanism is composed of a cylindrical lower member 18, an upper member 19 and a plurality of rod members 20. The lower member 18 is slidably mounted on the lower portion 2A of the lower housing member 2 and formed at its upper end with a flange 18A extending radially outward beyond the shoulder portion 6. The upper member 19 is axially slidably supported by the plate member 14 and has portions axially extending to such a position as to be engageable by the nuts 12 of the plunger driving mechanism. The rod members 20 are disposed between the upper member 19 and the lower member 18 so as to pass through axially extending perforations formed in the upper portion 2C of the lower housing member 2. A cup-like member 21 having at its bottom wall an opening for passing the lower member 18 therethrough is threaded to the lower portion of the upper portion 2C of the lower housing member 2. A compression spring 22 is disposed between the flange 18A and the bottom wall of the cup-like member 21 so that the tip removing mechanism is maintained at its upper or non-operative position so long as the nuts 12 are not lowered beyond a predetermined lower limit.

An O-shaped ring 23 for assuring the sealing of the cylinder chamber 1 is provided at an upper portion of the connection portion between the lower housing member 2 and the upper housing member 4 and secured at a predetermined position by a fixing member 24.

A cap 25 is fixed through a threaded engagement to the upper end of the upper housing member 4. A starting switch 26 such as will be described later may be attached to the cap 25. A printed circuit board (not shown) carrying several parts directly related to the starting switch 26 may be mounted on the motor 8 at its cap side.

In the practical device, there are provided electrical cords including wires to supply driving power to the motor 8, wires to be connected to the terminals $T_1$, $T_2$ and $T_3$ and wires from the start switch 26. These cords are, however, omitted for the sake of clarification of the drawings.

In operation, the electric motor 8 of the device is rotated so that, in the stand-by state for sucking a liquid the tip 17A of the slider 17 of the device is in the position "a" shown in FIG. 2, in the sucking completion state it is in the position "b", and in the discharge completion state it is in the position "c", in this order. Thereafter, the motor is rotated so that the tip 17A comes to the position "a" and then reaches the position "d" where the tip is removed. Then, the motor 8 is further rotated so that the tip 17A of the slider 17 returns to the position "a" from the position "d" to assume the stand-by state for the sucking operation. Thus, as the motor 8 is rotated, as stated above, the stroke (b-c) with which the plunger 3 is moved for discharging a liquid is selected to be larger than the stroke (b-a) with which the plunger 3 is moved for sucking a liquid. This is for the purpose of assuring that the liquid is completely removed from the tip. The relationship between the nuts 12 to which the slider 17 is secured and the upper member 19 of the chip removing mechanism is such that when the tip 17A of the slider 17 is lowered to the position "c" in FIG. 2 the nuts 12 can not come into contact with the upper member 19; however, when the tip 17A of the slider 17 is lowered to the position "d" in FIG. 2 the nuts 12 come in contact with the upper member 19 so as to press down the member 19 which in turn urges the lower member 18 downward through the intermediate members 20 so as to remove the tip 7.

The rotation of the motor 8 in such a manner as stated above may be attained by detecting the position of the plunger 3 on the basis of the variable voltage produced from the terminal $T_3$ of the potentiometer P and controlling the direction and amount of the rotation of the motor 8 by the utilization of such detected voltage.

Figure 5:
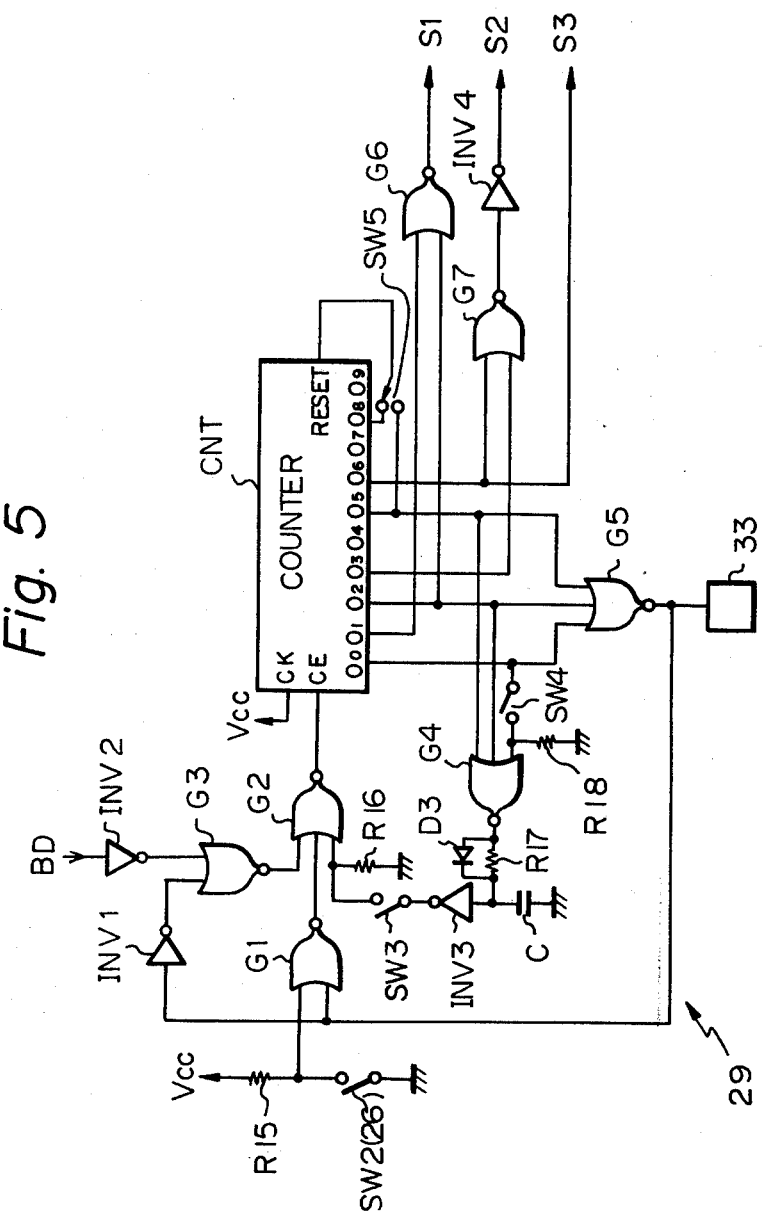
FIG. 5 shows a schematic diagram of a sequence circuit which forms a part of the circuit of FIG. 4.

FIG. 4 shows an example of the circuit configuration of the control device of the pipette system according to the invention, and FIG. 5 shows a schematic diagram of a sequence circuit forming a part of the circuit of FIG. 4.

This control device is composed of, in general, a servo system 27 for supplying the motor 8 with driving power while receiving the variable voltage from the potentiometer P as a feedback voltage, a balance-point detector section 28 for producing a balance-point detection pulse BD when the servo system 27 reaches a balance-point, and a sequence circuit 29 for changing the balance-point of the servo system 27 in a predetermined sequence by varying the status of its own outputs, i.e. the combination of S1, S2 and S3 (described later), in response to a signal produced upon the actuation of a switch corresponding to the start switch 26 shown in FIG. 1 or the balance-point detection pulse BD generated in the balance-point detector section 28.

The servo system 27 comprises a plunger driver section 30, a balanced amplifier section 31, and a balance-point designation section 32 for designating the position of the slider 17 on the resistor element 15 at which the balanced amplifier section 31 reaches its balanced state to thereby designate the direction and amount of rotation of the motor 8.

In the plunger driver section 30, one terminal $T_1$ of the linear displacement type potentiometer P is grounded and the other terminal $T_2$ of the same is connected to a negative voltage source $-V$. The slider 17 of the potentiometer P slides on the resistor member 15 as the motor 8 rotates, in the manner as stated with respect to FIG. 1.

The balanced amplifier section 31 comprises resistors R1 and R2, an operational amplifier OP1, transistors Q1 and Q2, a negative voltage source $-V$, and a positive voltage source $+V$, which are connected in the manner as shown in the figure. This balanced amplifier section 31 supplies the motor 8 with driving power until the voltage at the point indicated by "X" becomes substantially zero.

The balance-point detector section 28 comprises resistors R3 and R4, diodes D1 and D2, transistors Q3 and Q4, and a positive voltage source $+V$, which are connected in the manner as shown in the drawing, and produces an output signal BD when the voltage at the point "X" becomes substantially zero. In more detail, if the forward voltage drop of the diode D1 or D2 is represented by $V_F$ and the forward voltage drop between the base and emitter of the transistor Q3 or Q4 is represented by $V_{BE}$, the transistor Q3 is turned on, on one hand, when the potential at the point "X" becomes below the value $-(V_F+V_{BE})$, so that a current flows through a path from the positive voltage source $+V$ to the resistor R3 through the resistor R4, the transistor Q3 and the diode D1 to thereby cause the potential of the output signal BD to be substantially zero, while the transistor Q4 is turned on; on the other hand, when the potential at the point "X" becomes beyond the value $+(V_F+V_{BE})$, a current flows through a path from the positive voltage source $+V$ to the ground through the resistor R4 and the transistor Q4 to thereby cause the potential of the output BD to be substantially zero. In the state where the potential at the point "X" is larger than the value $-(V_F+V_{BE})$ but smaller than the value $+(V_F+V_{BE})$, namely at the balance-point, both the transistors Q3 and Q4 are turned on so that the potential of the output BD becomes a value substantially equal to the source voltage $+V$. In this manner the output signal BD is produced.

The balance-point designation section 32 comprises a resistor R5, a transistor Q5, a positive voltage source $+V$, resistors R6 to R10, a selector switch SW1, a resistor R11, a transistor Q6, resistors R12 and R13, a transistor Q7 and a resistor R14, which are connected in the manner as shown in the drawing. This balance-point designation section 32 designates a position of the slider 17 on the resistor element 15 at which the balanced amplifier section 31 reaches its balanced state, in response to the signals S1, S2 and S3 from the sequence circuit 29 and in accordance with the position of the selector switch SW1, thereby designating the direction and amount of rotation of the motor 8. In this balance-point designation section 32, the transistors Q7, Q6 and Q5 and the resistors R6 to R10, R12 and R14 constitute a current adder circuit. When only the transistor Q7 is in its on-state, a current flows from the positive voltage source $+V$ to the "$-$" input terminal of the operational amplifier OP1 through the resistor R14, and in this state a balanced condition is obtained when the tip 17A of the slider is at the point "c" shown in FIG. 2. When the transistors Q6 and Q7 are in their on-state, a current flows from the positive voltage source +V to the "−" input terminal of the operational amplifier OP1 through the resistors R12 and R14, and in this state a balanced condition is obtained when the slider tip 17A is at the point "a" shown in FIG. 2. When all the transistors Q7, Q6 and Q5 are in their on-state, a current flows from the positive voltage source +V to the "−" input terminal of the operational amplifier OP1 through a selected one of the resistors R6 to R10, the resistors R12 and R14, and in this state a balanced condition is obtained when the slider tip 17A is at the point "b" shown in FIG. 2. Since the amplification factor of the operational amplifier OP1 is very large, the potential difference between the "+" and "−" input terminals is nearly zero volt. The potentials at the "−" and "+" input terminals are substantially zero volt and completely zero volt, respectively, and the "−" input terminal is regarded as an imaginary ground, so that each of the currents respectively flowing through the selected one of the resistors R6 to R10, the resistor R12 and the resistor R14 can be considered as a constant current.

The sequence circuit 29 comprises an electric source $V_{CC}$, a resistor R15, a start switch SW2 (which corresponds to the switch 26 shown in FIG. 1), NOR circuits G1 and G2, a five bit Johnson counter CNT, inverters INV1 and INV2, a NOR circuit G3, a resistor R16, a switch SW3, an inverter INV3, a capacitor C, a diode D3, a resistor R17, a NOR circuit G4, a resistor R18, a switch SW4, NOR circuits G5, G6 and G7, an inverter INV4 and a switch SW5, which are connected in the manner as shown in FIG. 5. The counter CNT may be constructed by an integrated circuit (IC) available under the trade name of RCA-CD4017 and each of the inverters INV1 to INV4 and NOR circuits G1 to G7 also may be constructed by an IC. Further, the resistor R15 may be mounted on the printed circuit board previously mentioned in conjunction with FIG. 1.

A voltage $V_{CC}$ is always applied to an input CK of the counter CNT so that the counter CNT is advanced step by step every time it receives a stepping pulse at its input CE thereby shifting the output from which a high level signal is produced from one output at prevent activated to the next one. The stepping pulse is applied to the counter CNT when the start switch SW2 is actuated or when the servo system of FIG. 4 reaches a balance-point so that the balance-point detector section 28 produces its output signal BD. In the initial state of the counter CNT, the output $O_\phi$ is at its high level or in the binary "1" status and all the remaining outputs $O_1$ to $O_8$ are at their low level. Upon receipt of a first stepping pulse only the output $O_1$ becomes high and then upon receipt of a second stepping pulse only the output $O_2$ becomes high. In this manner, the output from which a high level signal is produced is shifted one by one every time a stepping pulse is received, and when such a status that only the output $O_8$ is at its high level is reached the counter CNT is reset in its initial state because this output $O_8$ is connected to the reset terminal RESET through the switch SW5.

The table I shown below shows the change in the state of the counter CNT when the counter CNT receives stepping pulses sequentially with the switches SW3 and SW4 opened. In the table the symbols "H" and "L" designate high and low levels, respectively.

TABLE I

| STATUS | OUTPUT OF COUNTER "CNT" | S1 | S2 | S3 | OPERATION | INPUT RECEIVE FOR STEP COUNTER | BALANCE-POINT OF POTENTIOMETER 8 (FIG. 2) |
|---|---|---|---|---|---|---|---|
| ∅ | $O_\phi$ "H" ALL THE REMAINING "L" | H | H | L | STAND-BY FOR SUCKING (INITIAL STATUS) | SW2 | To "a" |
| 1 | $O_1$ "H" ALL THE REMAINING "L" | L | L | L | DURING SUCKING | BD | "b" |
| 2 | $O_2$ "H" ALL THE REMAINING "L" | L | L | L | SUCKING COMPLETION STAND-BY FOR DISCHARGING | SW2 | "b" |
| 3 | $O_3$ "H" ALL THE REMAINING "L" | H | H | L | DURING DISCHARGING | BD | To "c" |
| 4 | $O_4$ "H" ALL THE REMAINING "L" | H | L | L | DISCHARGING COMPLETION | BD | "c" AFTER ARRIVAL AT "c" To "a" |
| 5 | $O_5$ "H" ALL THE REMAINING "L" | H | L | L | STAND-BY FOR TIP REMOVAL | SW2 | "a" |
| 6 | $O_6$ "H" ALL THE REMAINING "L" | H | H | H | DURING TIP REMOVAL | BD | To "d" |
| 7 | $O_7$ "H" ALL THE REMAINING "L" | H | L | L | TIP REMOVAL COMPLETION TO INITIAL STATUS | BD | "d" AFTER ARRIVAL AT "d" To "a" |

The output signals S1, S2 and S3 are respectively applied to the transistors Q5, Q6 and Q7 in the balance-point designation section 32 of the servo system 27 shown in FIG. 4, so as to effect the on-off control of these transistors Q5, Q6 and Q7. The correspondence between the status of the output signals S1, S2 and S3 and the status of the transistors Q5, Q6 and Q7 is shown in the Table II shown below.

TABLE II

| Status Number | S1 | S2 | S3 | Q5 | Q6 | Q7 |
|---|---|---|---|---|---|---|
| ∅ | H | L | L | OFF | ON | ON |
| 1 | L | L | L | ON | ON | ON |
| 2 | L | L | L | ON | ON | ON |
| 3 | H | H | L | OFF | OFF | ON |
| 4 | H | L | L | OFF | ON | ON |
| 5 | H | L | L | OFF | ON | ON |
| 6 | H | H | H | OFF | OFF | OFF |
| 7 | H | L | L | OFF | ON | ON |

Each of the transistors Q5, Q6 and Q7 is arranged so that when rendered on it permits a current to flow therethrough from the positive power source +V. Accordingly, when all the transistors Q5, Q6 and Q7 are in their on-state, a maximum current may be caused to flow in combination and in this case the slider 17 is moved to the uppermost position when viewed in FIG. 4 in order to obtain a balance-point of the balanced amplifier section 31, the position corresponding to the sucking completion position. This position may be changed depending on the position of the switch SW1. To this end, the resistance values of the resistors R6 to R10 are selected to satisfy the relation of R6<R7<R8<R9<R10 so that 100 percent of the total amount of liquid capable of being admitted in one tip may be set by the resistor R6, 80 percent by the resistor R7, 60 percent by the resistor R8, 40 percent by the resistor R9 and 20 percent by the resistor R10.

On the other hand, in the state where all the transistors Q5, Q6 and Q7 are in their off-state, the current caused to flow through these transistors becomes zero or its minimum value. At this time, the slider 17 is moved to the lowest position when viewed in FIG. 4 in order to obtain a balance-point, the position corresponding to the chip removal completion position.

Taking the aforementioned matters into consideration, the function of the circuits of FIGS. 4 and 5 will be described hereunder with reference to the Tables I and II.

In the initial status, the counter CNT is in the state $\phi$ wherein only the output $O_\phi$ thereof is at "1" and the transistors Q6 and Q7 are in their on-state. At this time the balance-point of the potentiometer is the position indicated by "a" in FIG. 2. Upon the depressing of the starting switch SW2, a stepping pulse of "1" level is applied to the input CE of the counter CNT through the NOR circuits G1 and G2 thereby causing the counter CNT to be in its status 1 and turning the transistors Q5 to Q7 on. In this status, the balance-point to be reached by the potentiometer P is the point "b" of FIG. 2. The stroke (b-a) may be preset by the switch SW1 as described above. When the point "b" is reached by the slider 17, the output of the balanced amplifier section 31 becomes zero, and in response to this state the balance-point detector section 28 produces its output BD. This output BD is then applied as a stepping pulse to the input CE of the counter CNT through the NOR circuits G3 and G2, causing the counter CNT to be in its status 2. In this status, which is the sucking completion condition, the slider 17 of the potentiometer P waits for an input by the switch SW2 while staying at the position "b".

Next, when the starting switch SW2 is depressed, a stepping pulse is applied to the input CE of the counter CNT so as to change the counter CNT to its status 3 and turn only the transistor Q7 on. Under this condition, the balance-point to be reached by the potentiometer P is the point "c" of FIG. 2. When the point "c" is reached by the slider 17, the balance-point detector section 28 produces its output signal BD, causing the counter CNT to be in its status 4. In response to this status, the transistors Q6 and Q7 are turned on and the slider 17 is returned to the point "a" of FIG. 2. When the point "a" is reached by the slider 17, the balance-point detector section 28 produces its output signal BD, causing the counter CNT to take its status 5. The slider 17 of the potentiometer P waits for an input by the switch SW2 while staying at the point "a", this condition corresponds to the discharging completion status.

Next, when the start switch SW2 is depressed again, the counter CNT is caused to take its status 6, turning all the transistors Q5 to Q7 off. Under this condition, the balance-point to be reached by the potentiometer P is the point "d" of FIG. 2. In the process until the point "d" is reached by the slider 17 of the potentiometer P, the nuts 12 urges the tip removing mechanism downward against the force of the spring 22 to remove the tip 7. When the point "d" is reached by the slider 17 of the potentiometer P, the balance-point detector section 28 produces its output signal BD, causing the counter CNT to take its status 7 and turning the transistors Q6 and Q7 on to thereby cause the slider 17 to return to the point "a". When the point "a" is reached by the slider 17, the output O8 of the counter CNT is rendered high by the output signal BD produced by the balance-point detector section 28 so that the counter CNT is reset to return to its status $\phi$ because the output O8 is connected to the reset terminal RESET through the switch SW5.

In such a manner as described above, a cycle of sequence operation including sucking a liquid, discharging the same and removing a tip is completed.

If the switch SW5 is changed over so as to connect the output O5 of the counter CNT to the reset terminal RESET of the same, only the sucking and discharging operations are achieved without effecting the tip removal among the sequence operation as described above.

In the case where the switch SW3 is closed, a stepping pulse is produced from the time constant circuit composed by the resistor B17, the diode D3 and the capacitor C, when a predetermined period is elapsed after the status 2 or 5 has been reached, so that the status of the counter CNT is automatically advanced to the next one without depressing the start switch SW2 because the stepping pulse is applied to the input CE of the counter CNT through the NOR circuit G2. In this manner, the switch SW3 functions as a manual-/automatic change-over switch.

Further, in the case where the switch SW4 is closed with the switch SW3 closed, a stepping pulse is produced from the above-mentioned time constant circuit when a predetermined period is elapsed after the counter CNT has been reset to its status $\phi$ (zero) and therefore numbers of sequence cycles each including liquid sucking, discharging and tip removing operations may be automatically repeatedly achieved.

An acoustic indicator may be provided, as shown in FIG. 5 by the reference numeral 33, for indicating acoustically the completion of the respective operations of liquid sucking, liquid discharging and chip removal, every time each of these operations has been completed. This acoustic indicator generates a sound for a short period in response to the rising edge of the output signal of the NOR circuit G5.

By way of mere example, the dimensions of the pipette device and the control device which have been actually embodied and the volume of liquid to be treated by the pipette device will be described hereunder. The total length of the pipette device is about 300 mm, the respective diameters of the upper housing member 4 are 28–30 mm at a portion at which the plunger driver section is disposed, and about 40 mm at the flange 4A, the diameter of the lower member of the tip removing mechanism is about 10 mm, the weight of the pipette device is about 150 gr., and the size of the control device including the circuits 31, 32, 28 and 29 is 90 mm×140 mm×50 mm. Two kinds of tips having maximum capacities of 1000 $\mu l$ and 100 $\mu l$ were used.

Description has been made above with respect to the case where this invention is applied to a pipette device. However, the principle of this invention is not restricted to the application to such a pipette device but may be applied to a dispenser or the like, because the dispenser is basically similar to the pipette device in construction of the mechanism for sucking/discharging a liquid, although it is used differently from the latter.

Figure 6:
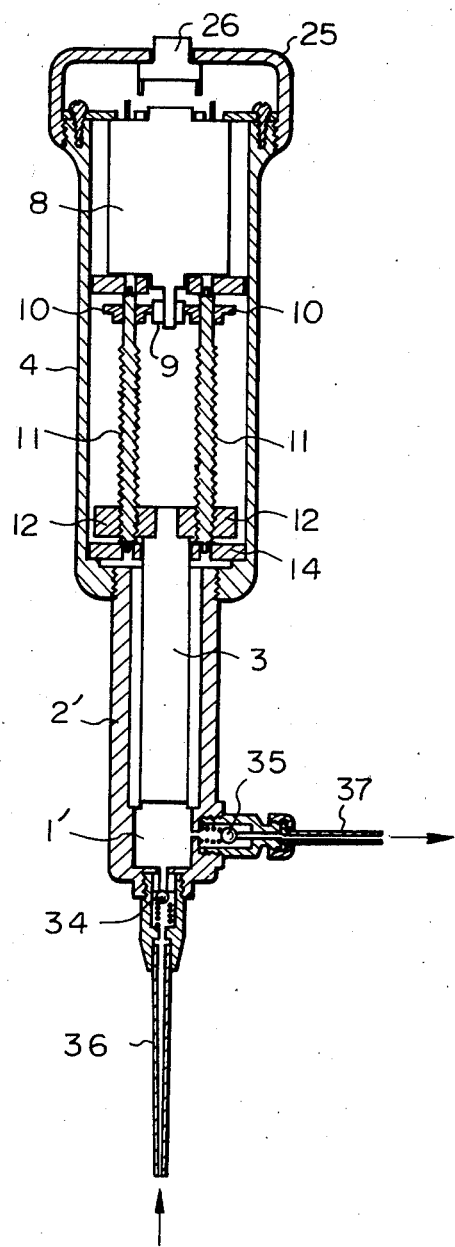
FIG. 6 shows one example of the construction of a dispenser device constructed in accordance with the teaching of the invention.

FIG. 6 shows an embodiment of a dispenser to which the fundamental construction according to this invention has been applied. The dispenser of FIG. 6 has a modified lower housing member 2' and functions in such a manner as to introduce a liquid into a cylinder chamber 1' through a sucking inlet member 36 and then discharge it through a discharging outlet member 37 while controlling the direction of flow of liquid by check valve 34 and 35 respectively provided at the sucking inlet and discharging outlet of the cylinder chamber 1' for preventing liquid from backing up. Of course, no tip removing mechanism is provided in this case. Also in this embodiment in which this invention is applied to a dispenser, the circuits of FIGS. 4 and 5 may be used as a control device. In this case, however, the output O₄ of the counter CNT may be connected to the reset terminal RESET and the transistors Q6 and Q7 may be omitted in FIG. 4 on one hand, and the NOR circuit G7, the inverter INV and the terminals S2 and S3 which are the parts concerned with the transistors Q6 and Q7 may be also omitted in FIG. 5 on the other hand. The thus modified control device provides a reciprocal motion with the points "a" and "b" as the balance-points.

As aforementioned, this invention provides a pipette device in which the respective operations of sucking a liquid, discharging the same, and removing a tip may be achieved by simply actuating a switch without requiring an operator's finger action to lower a knob or the like. Since the plunger is so arranged as to be driven by an electric motor in the device according to the present invention, the sucking and discharging of a liquid may be achieved with a constant speed and a constant volume of liquid may be sucked in each cycle. In comparison with prior art devices in respect to variation in performance, the probability of error with the device according to this invention is not larger than 0.2, while with the prior art devices it is about 0.3-0.7. Further, according to this invention, there is no risk of the operator getting tenonitis or the like due to prolonged finger action.

Having described a preferred embodiment of this invention, it will now be apparent to those skilled in the art that various modifications may be made without departing from the inventive concepts. For example, only one lead or more than two leads screw may be used to constitute the plunger driver mechanism although two lead screws have been illustrated in the drawing. The potentiometer may have a different construction and the slider thereof may be mounted in a different manner from that illustrated in the figure such that, for example, the slider may be moved by the gear 9 through appropriate coupling means to thereby produce a voltage which varies in accordance with the position of the plunger. Further, the control device may be modified in various manners within the scope of knowledge of those skilled in this art, as far as a variable voltage from a potentiometer is used as a feedback voltage. Therefore, it is felt that the invention should not be restricted to its described embodiments but rather should be limited only by the spirit and scope of the appended claims.

What is claimed is:

1. A pipette device capable of automatically sucking and discharging liquid and also capable of automatically removing a tip comprising: housing means, a tip frictionally fitted on a lower end of said housing means, a cylinder chamber defined in said housing means and communicating with an interior of said tip, plunging means slidably received in the cylinder chamber, a potentiometer for producing a signal representing the position of said plunger means with respect to said cylinder chamber, plunger driving means including an electric motor and operably coupled with said plunger means for moving the same between at least three predetermined positions in accordance with said signal, said predetermined positions including a terminal sucking position, a terminal discharging position and a tip removing position, and a tip removing mechanism including a lower cylindrical member slidably mounted on the lower end of said housing means with a lower end of said cylindrical member being normally located against an upper end of said tip which is mounted on the lower end of said housing means and at least two rod members extending vertically in said housing means and being slidable relative thereto with said rod members having lower ends engaging with an upper end of said cylindrical member, and upper ends of said rod members being actuated by said plunger driving means when said plunger means moves from said terminal discharging position to said tip removing position, whereby the mounted tip is pressed downward by said lower cylindrical member and is removed from the pipette device.

2. A pipette device according to claim 1, further comprising a spring biasing the lower cylindrical member upwards with respect to the housing means.

3. A pipette device according to claim 2, wherein said lower cylindrical member has a radial flange in an upper end thereof, said housing means includes a cap encircling an upper end portion thereof, and said spring acts between a bottom wall of a cup-like member extending upwardly from below an intermediate portion of said lower end of said housing means and the radial flange of the lower cylindrical member.

4. A pipette device capable of automatically sucking and discharging liquid and also capable of automatically removing a tip comprising:
plunger means slidably received in a cylinder chamber communicating with an interior of said tip fitted on said pipette device;
a potentiometer for producing a variable signal representing the position of said plunger means with respect to said cylinder chamber;
plunger driving means including an electric motor and operably coupled with said plunger means for moving the same between at least three predetermined positions in accordance with said variable signal, said predetermined positions including a terminal sucking position, a terminal discharging position and a tip removing position; and
control means including;
a servo system receiving said variable signal from said potentiometer and supplying an output drive signal to said motor, said servo system being operative to reach a designated one of several balance-points corresponding respectively to said predetermined positions, a balance-power detecting means connected to said servo system for generating a balance-point detection signal whenever said servo system has reached one of said balance-points, and a sequence circuit responsive to said balance-point detection signal or to actuation of a start switch for supplying to said servo system an output signal designating the next one of said balance-points in a predetermined sequence.

5. A pipette device according to claim 4, wherein said sequence circuit is responsive to the first actuation of said start switch for producing a first output signal designating a first one of said balance-points corresponding to said terminal sucking position, to the second actuation of said start switch for producing a second output signal designating a second one of said balance-points corresponding to said terminal discharge position, and to the third actuation of said start switch for producing a third output signal designating a third one of said balance-points corresponding to said third tip removing position.

6. A pipette device according to claim 4, wherein said sequence circuit includes;
- a counter unit adapted to be incremented by said balance-point detection signal or upon the actuation of said start switch for generating a stepping signal, and
- a logic circuit connected to the output of said counter unit and responsive to said stepping signal for generating a set of logic signals as said designation output signal.

* * * * *